US012623402B2

(12) United States Patent
Abdo

(10) Patent No.: US 12,623,402 B2
(45) Date of Patent: *May 12, 2026

(54) THREE-DIMENSIONAL (3D) PRINTER HAVING A VARIOUSLY CONFIGURABLE PRINTING PLATFORM ASSEMBLY

(71) Applicant: KING SAUD UNIVERSITY, Riyadh (SA)

(72) Inventor: Basem Motea Abdullah Abdo, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/243,106

(22) Filed: Jun. 19, 2025

(65) Prior Publication Data

US 2025/0312970 A1      Oct. 9, 2025

Related U.S. Application Data

(62) Division of application No. 18/615,064, filed on Mar. 25, 2024, now Pat. No. 12,358,221.

(51) Int. Cl.
*B29C 64/245*      (2017.01)
*B33Y 10/00*      (2015.01)
*B33Y 30/00*      (2015.01)

(52) U.S. Cl.
CPC ............. *B29C 64/245* (2017.08); *B33Y 10/00* (2014.12); *B33Y 30/00* (2014.12)

(58) Field of Classification Search
CPC .............................. B29C 64/245; B23Q 1/035
See application file for complete search history.

(56) References Cited

U.S. PATENT DOCUMENTS 6,845,680 B2     1/2005   Brent et al.
7,942,987 B2     5/2011   Crump et al.
(Continued)

FOREIGN PATENT DOCUMENTS

CN        105711095 A   *   6/2016    ............. B33Y 30/00
CN        109278290 B        7/2021
(Continued)

OTHER PUBLICATIONS

Machine translation of JP2011056878 (Year: 2011).*
Machine translation of CN105711095A (Year: 2016).*

*Primary Examiner* — Ariella Machness
(74) *Attorney, Agent, or Firm* — Nath, Goldberg & Meyer; Joshua B. Goldberg

(57)      ABSTRACT

A three-dimensional (3D) printer includes a platform assembly on which a 3D object can be built, an extruder, a filament feeding assembly feeding a filament to the extruder, a movable nozzle receiving heated filament from the extruder in a flowable form and directing the flowable filament material on the platform assembly to create the 3D object, and a controlling circuit for controlling an operation of the 3D printer. The platform assembly may include first and second plates separated from one another, a plurality of elongated structures connecting the first and second plates to one another, and a plurality of post assemblies disposed between the first and second plates. The post assemblies may include posts that can be selectively raised and lowered to protrude over the plate, from among the first and second plates, on which the 3D object will be built to assist with the building process.

14 Claims, 10 Drawing Sheets

(56) References Cited

U.S. PATENT DOCUMENTS

| | | | |
|---|---|---|---|
| 9,289,946 B2 | 3/2016 | Perez et al. | |
| 9,925,721 B2 | 3/2018 | Grasegger et al. | |
| 10,906,291 B2 | 2/2021 | Bloome et al. | |
| 11,186,038 B2 | 11/2021 | Loeffler et al. | |
| 11,330,865 B2 | 5/2022 | Wang et al. | |
| 11,571,858 B2 | 2/2023 | Newell | |
| 2015/0059503 A1* | 3/2015 | Baric | B23Q 1/035 |
| | | | 74/89.32 |
| 2019/0036337 A1 | 1/2019 | Zhang et al. | |
| 2019/0315115 A1 | 10/2019 | Reese et al. | |
| 2020/0108465 A1 | 4/2020 | Sweetland | |
| 2021/0122105 A1 | 4/2021 | Van Esbroeck et al. | |
| 2021/0286336 A1* | 9/2021 | Cook | B23Q 17/007 |
| 2022/0402208 A1* | 12/2022 | Inomoto | B29C 64/245 |
| 2023/0120908 A1 | 4/2023 | Cathey | |

FOREIGN PATENT DOCUMENTS

| | | | |
|---|---|---|---|
| CN | 214557420 U | | 11/2021 |
| JP | 2011056878 A | * | 3/2011 |
| RU | 216676 U1 | | 2/2023 |
| WO | 2019077512 A1 | | 4/2019 |

* cited by examiner

THREE-DIMENSIONAL (3D) PRINTER HAVING A VARIOUSLY CONFIGURABLE PRINTING PLATFORM ASSEMBLY

CROSS-REFERENCE TO RELATED APPLICATION

This application is a divisional of U.S. patent application Ser. No. 18/615,064, filed on Mar. 25, 2024, the entire contents of which are incorporated herein by reference.

TECHNICAL FIELD

The present disclosure relates to a three-dimensional (3D) printer, and more particularly, to a 3D printer having a variously configurable printing platform assembly.

DISCUSSION OF THE RELATED ART

Three-dimensional (3D) printing, also known as additive manufacturing (AM), allows users to create 3D objects based on digital designs by layering materials such as plastics, metals, and ceramics over a building platform. This process offers several advantages over traditional manufacturing methods, including the ability to create complex geometries, reducing material waste, eliminating the need for molds or tooling, and reducing production time and costs. As 3D printing technology continues to mature, the technology is expected to become widely adopted in a wide range of industries including healthcare, automotive, aerospace, and consumer products.

A fused deposition modeling (FDM) 3D printer operates, generally speaking, by heating a thermoplastic filament to make the filament flowable, and depositing the flowable filament layer by layer on a platform of the FDM 3D printer. This process is relatively affordable, making FDM printers popular among consumers.

FDM 3D printing can be used to create a wide variety of objects, including prototypes, functional parts, works of art, etc. FDM 3D printing may be used to create objects that have complex geometries, the manufacturing of which would otherwise be difficult to carry out by using traditional manufacturing methods.

An FDM 3D printer includes, generally speaking, a platform on which a desired 3D object can be built, an extruder, a filament feeding system configured to feed a filament to the extruder, a movable nozzle configured to receive heated filament from the extruder in flowable form and to direct the flowable filament on the platform for constructing the 3D object, one or more pieces of supporting material that aid the construction (e.g., printing) of the 3D object but are not part of the object, and a control circuit configured to control the process of discharging heated filament over the platform to create the intended 3D object.

One of the problems with conventional FDM 3D printing technology is the difficulty in printing (e.g., discharging flowable filament material) in between two elevated structures that are separated from one another in order to connect the structure tops to one another with flowable filament material. This difficulty is because the flowable filament material has fluid-like properties, and therefore, cannot support its own weight when laid horizontally in mid-air between the elevated structures. Therefore, a supporting material (e.g., a block of material), conventionally, must be created to have a size and shape that fills a void (or empty space) between two elevated structures and must be placed in the void in order to create a bridge-like structure that can support the flowable filament while it is being discharged from the printing nozzle between the tops of the elevated structures. When the 3D object has been printed and cooled down, the supporting material can be disconnected from the structure in order to present the 3D structure in its intended configuration.

This process of custom-making a supporting structure for every project that requires connecting two or more elevated structure tops to one another is undesirable because it increases the manufacturing complexity, manufacturing cost and manufacturing time.

SUMMARY

The present disclosure relates to a three-dimensional (3D) printer that includes a build platform having a number of variously configurable posts that can be selectively raised from under a building surface of the build platform to a desired/needed height above the building surface. This configuration can be used to structurally support a flowable filament being discharged from a nozzle of the 3D printer across a void or air gap that separates a pair of elevated structural components of a 3D object being printed. This configuration eliminates the need to manually create a supporting structure and place the supporting structure over the build platform to structurally support the flowable filament, as must be done when using conventional 3D printers.

In addition, the posts of the build platform of the present disclosure can be retracted at or below the building surface of the build platform when not needed.

BRIEF DESCRIPTION OF THE DRAWINGS

The above and other features of the present disclosure will become more apparent by describing in detail exemplary embodiments thereof in conjunction with the accompanying drawings, in which.

DETAILED DESCRIPTION OF THE EMBODIMENTS

Figure 1:
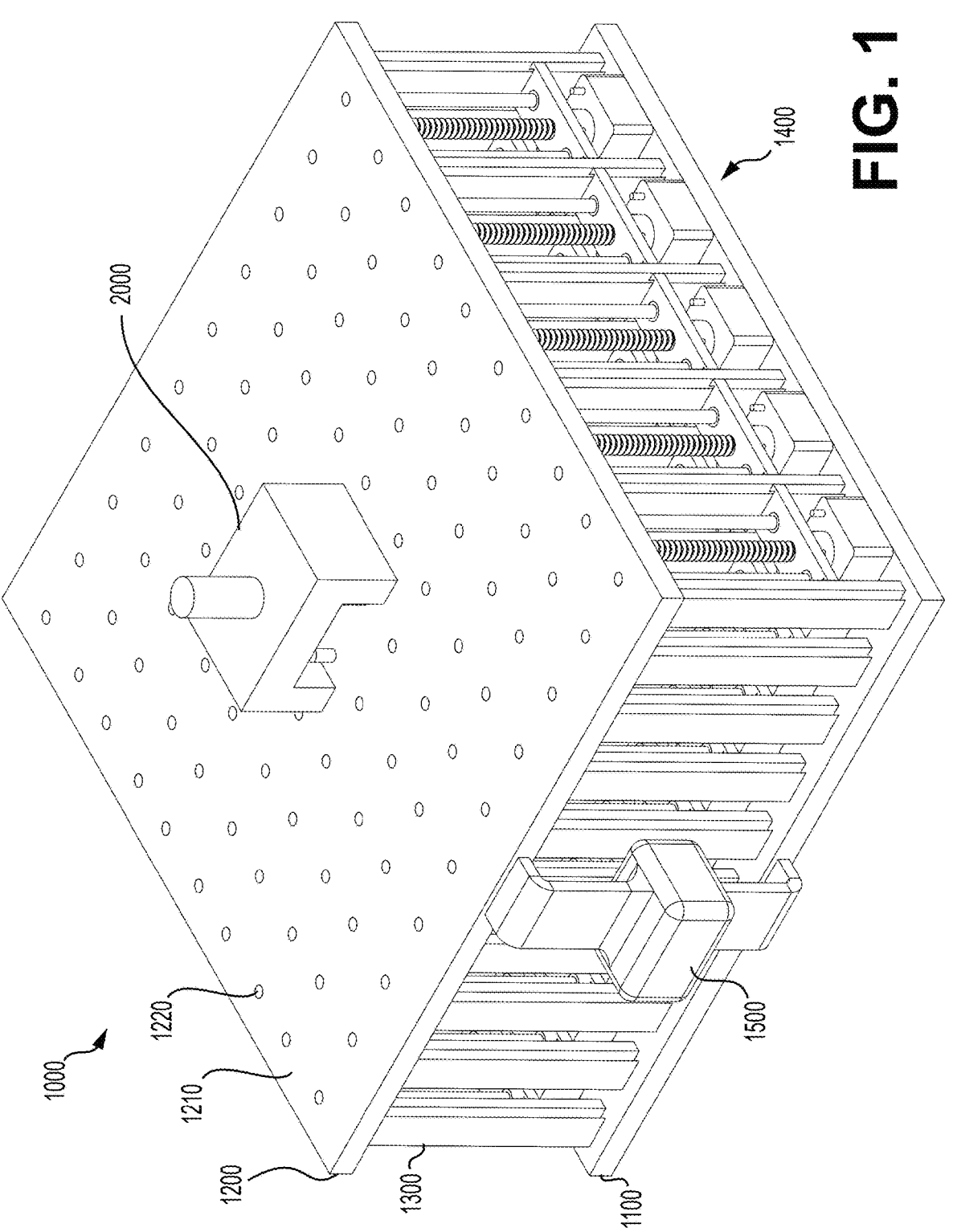
FIG. 1 is a perspective view illustrating a build platform of a three-dimensional (3D) printer according to an embodiment of the present disclosure.

Exemplary embodiments of the present disclosure will be described more fully hereinafter with reference to the accompanying drawings. The present disclosure may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

A three-dimensional (3D) printer of the present disclosure, for example, a fused deposition modeling (FDM) 3D printer, may include a platform assembly 1000 (illustrated with reference to FIGS. 1-5 and 6A-6B, the platform assembly may also be referred to as a "build platform" in this specification) on which a desired 3D object can be built, an extruder, a filament feeding assembly configured to feed a filament to the extruder, a movable nozzle configured to receive heated filament from the extruder in flowable form and to deposit the flowable filament material (while it is flowing through the nozzle) on different areas of the platform assembly for constructing the 3D object, and a controlling circuit 1500 (illustrated with reference to FIGS. 1-5 and 6A-6B) for controlling an operation of the entire 3D printer for printing (e.g., creating) the 3D object based on a received 3D design file.

The filament may include, for example, a thermoplastic material. Non-limiting examples of the thermoplastic material may include, for example, polylactic acid (PLA), acrylonitrile butadiene styrene (ABS), polyethylene terephthalate glycol (PETG), etc. Alternatively, or in addition, the filament may include a metal and/or ceramic material. In a particular non-limiting embodiment, the filament is made of a thermoplastic material.

The filament feeding assembly may include the filament (e.g., rolled in a spool and/or loaded in a cartridge) and is configured to feed the filament to the extruder.

The extruder is configured to receive the filament and to apply heat and/or pressure to the filament to make the filament flowable and to cause the flowable filament material to flow outwardly through the nozzle. The extruder may include, for example, a heating element for heating the filament in order to make the filament flowable. The extruder may also include a screw mechanism. The screw mechanism may be used, for example, for directing the flowable filament material toward the nozzle.

The nozzle is configured to deposit the flowable filament material on the platform assembly in order to construct a 3D object. The nozzle may be made of a metal and/or a ceramic material, and may have an outflow diameter (or dimension across) ranging, for example, from about 0.5 mm to about 1.0 mm. These dimensions are non-limiting. The nozzle may be heated by the extruder to maintain a substantially consistent temperature and to prevent clogging.

The controlling circuit 1500 may include hardware, a processor, and software including instructions, executable by the processor, for controlling the operation of the filament feeding assembly, the operation of the extruder, the movement of the nozzle over the platform assembly, and an operation of the platform assembly 1000 (as will be described below) to construct a 3D object on the platform assembly 1000 based on received design data of the 3D object (which can be received by the controlling circuit from a user operating a computer and/or a computer network communicatively coupled to the 3D printer). In other words, the controlling circuit 1500 may be configured to be communicatively coupled to the filament feeding assembly, the extruder, the nozzle and the build platform assembly 1000 in order to control operations thereof.

An exemplary platform assembly of a 3D printer of the present disclosure will now be described in detail with reference to FIGS. 1-5 and 6A-6B.

Referring to FIGS. 1-5 and 6A-6B, the platform assembly 1000 may include a first plate 1100 (e.g., a bottom plate) and a second plate 1200 disposed on the first plate 1100 and separated from the first plate 1100 by a certain distance. The second plate 1200 has a top surface 1210 on which 3D objects can be built. A plurality of elongated structures 1300 extend between the first and second plates 1100, 1200 and structurally connecting the first and second plates 1100, 1200 to one another. A plurality of adjustable post assemblies 1400 connect to the first and/or second plates 1100, 1200, and the controlling circuit 1500.

As illustrated in FIGS. 1-5 and 6A-6B, the elongated structures 1300 and the post assemblies 1400 may be arranged in rows and columns between the first and second plates 1100, 1200.

Each one of the post assemblies 1400 may include at least one movable post. The at least one movable post is configured to be moved in a first direction (e.g., upwardly, when the platform assembly is aligned horizontally or substantially horizontally) through a respective through opening 1220 (see FIG. 1) in the second plate 1200 in order to extend (or be raised) over the top surface 1210 of the second plate 1200 by a certain distance, as exemplarily illustrated in FIG. 5 for two of the post assemblies 1400 disposed under a 3D printed object 2000.

Figure 5:
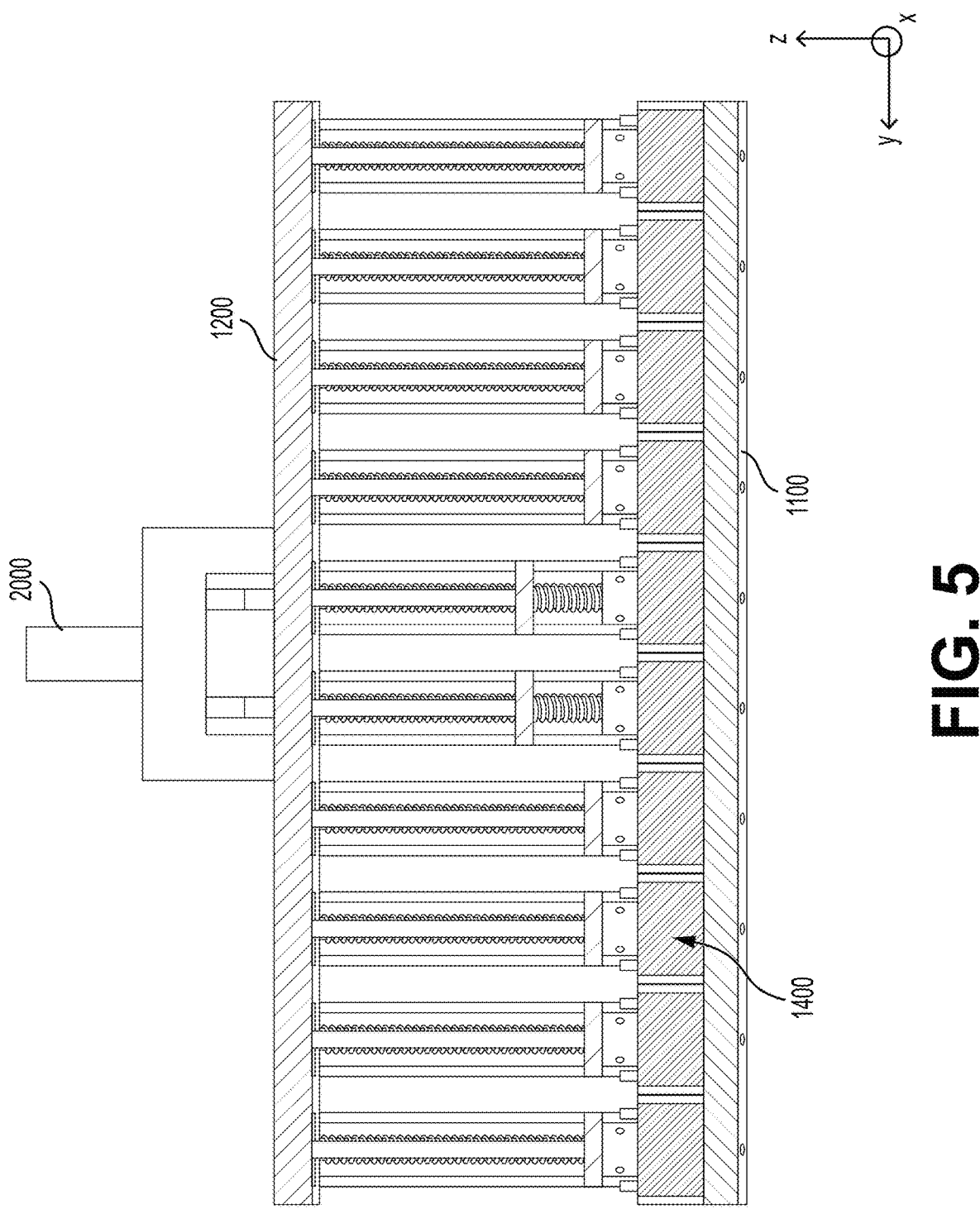
FIG. 5 is a side view illustrating a second side of the build platform of FIG. 1.

The at least one movable post of each post assembly 1400 is also configured to be moved in a second direction, opposite to the first direction thereof (e.g., downwardly) relative to its raised position, in order to reduce its height over the top surface 1210 of the second plate 1200 and/or to be disposed at or below the elevation of the top surface 1210 of the second plate 1200 (as illustrated in FIG. 5 for the post assemblies that are not located under the 3D printed object 2000). For example, the at least one movable post of each post assembly 1400 can be disposed at or below the top surface 1210 of the second plate when the 3D printer is not in use or when the 3D printer is in use but the post(s) of a particular post assembly 1400 need not be raised over the top surface 1210 of the second plate 1200.

This configuration, as will be described below in more detail, can be used to remove the requirement of manually creating a supporting structure for depositing a flowable filament between two elevated structural components of a 3D object to be printed and manually placing the supporting structure onto a build platform ahead of starting the 3D printing process, as must be done when using a conventional 3D printer. This is accomplished by the movable posts of each post assembly 1400 of the present disclosure being selectively raised to a height as needed (based on the configuration of a 3D object to be printed, within the limit of the length of each movable post) to create a supporting surface over the top surface 1210 of the second plate 1200 for supporting the flowable filament material while it being is poured from the nozzle to extend over a gap between two elevated components of the 3D structure being printed.

Figure 2:
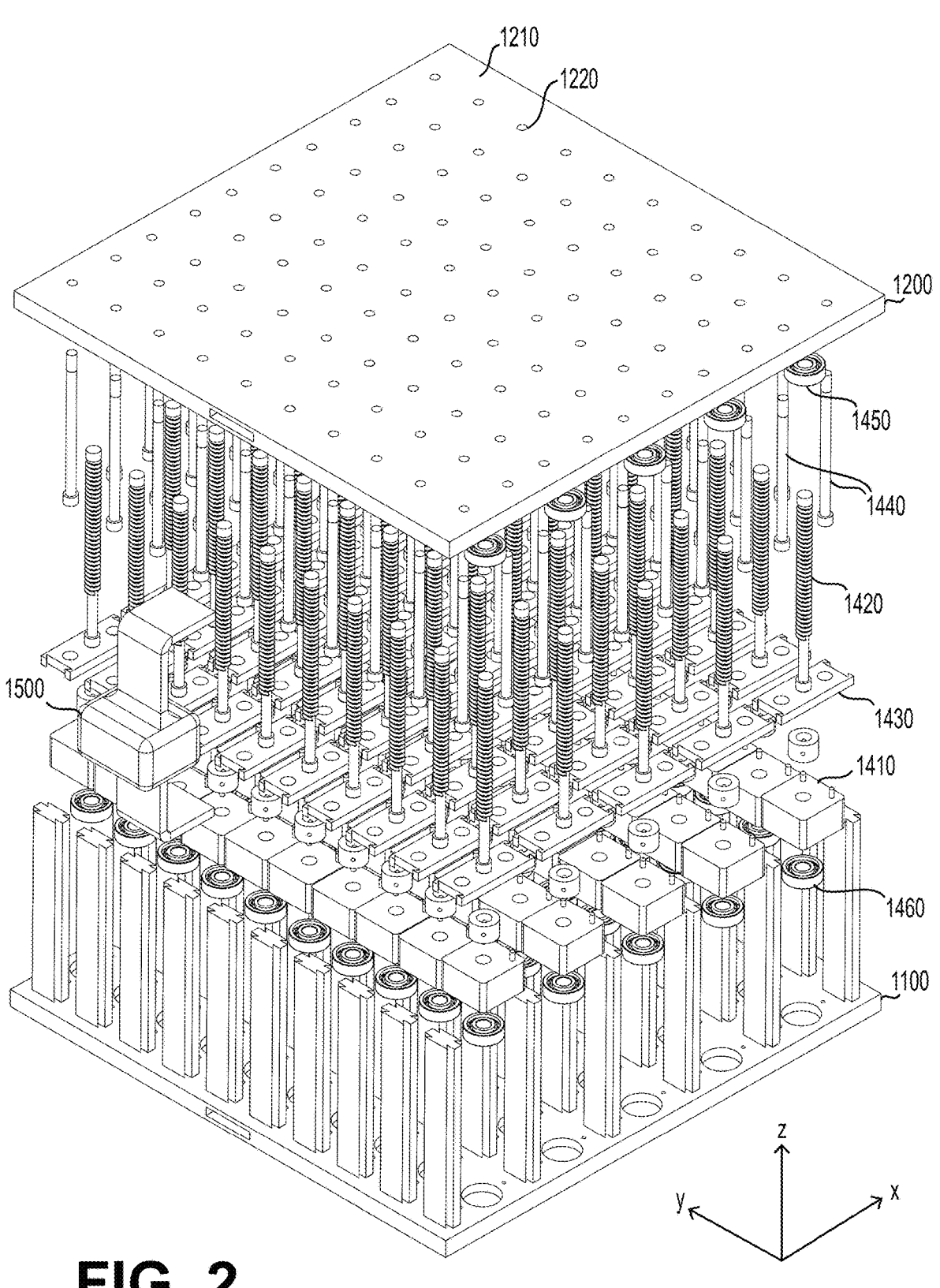
FIG. 2 is an exploded perspective view illustrating the build platform of FIG. 1.
Figure 3:
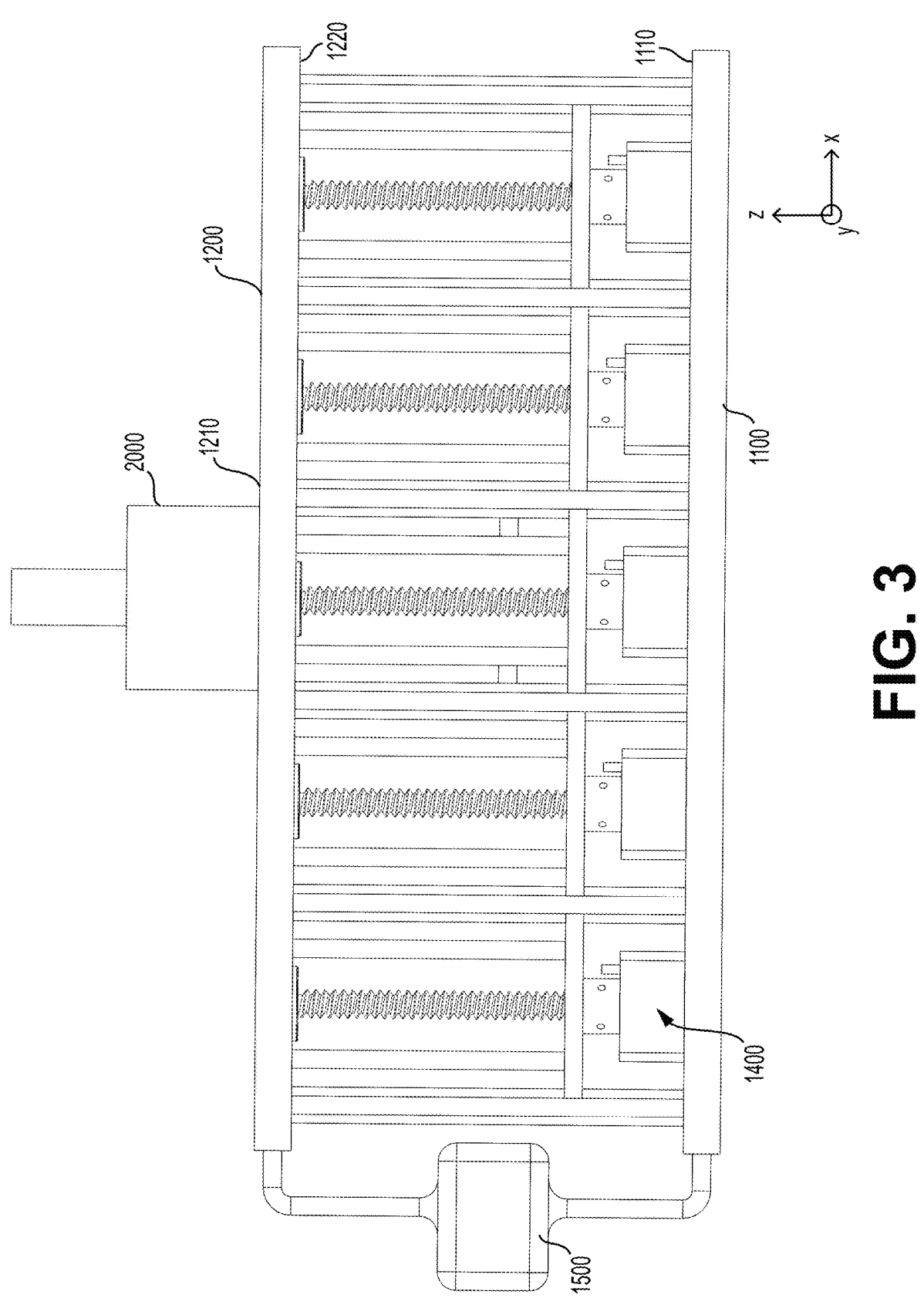
FIG. 3 is a side view illustrating a first side of the build platform of FIG. 1.
Figure 4:
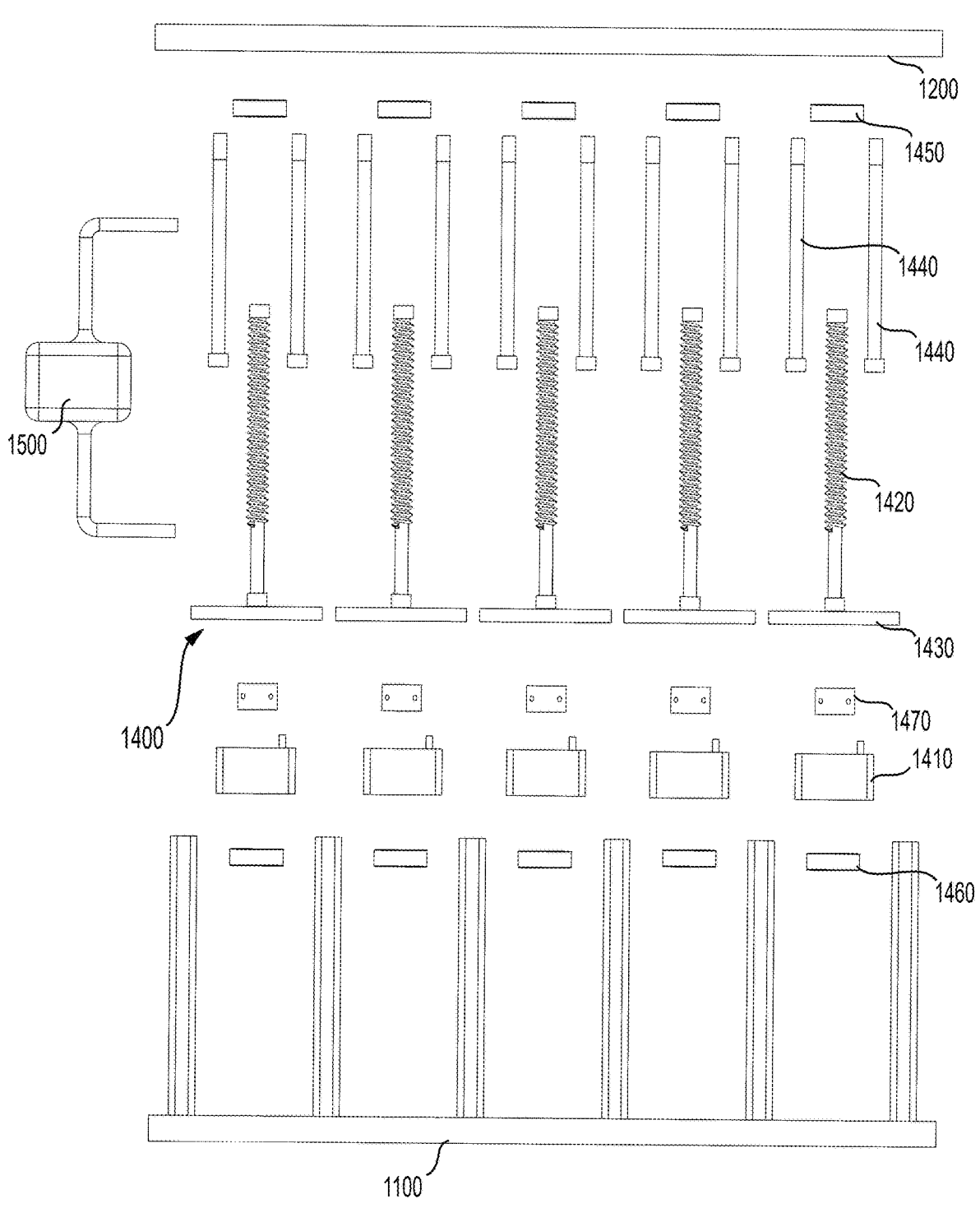
FIG. 4 is an exploded side view illustrating the first side of the build platform of FIG. 1.

In more detail, the first and second plates 1100, 1200 may each extend along a plane formed by directions X and Y (see FIGS. 2, 3 and 5). The post assemblies 1400 may each extend in a direction Z, which crosses the X and Y directions. For example, the Z direction may be perpendicular to the plane formed by the X and Y directions. For convenience of description, the plane formed by the X and Y directions may be referred to as a horizontal plane, and the Z direction may be referred to as a vertical direction. However, it is understood that the platform assembly can be tilted relative to the horizontal plane and the vertical direction as desired.

The length of the structures 1300 in the Z direction defines the separation distance between the first and second plates 1100, 1200. The post assemblies 1400 may be configured to fit entirely in the separating distance between the first and second plates 1100, 1200 when in the retracted state, as illustrated in FIGS. 3 and 5 for the post assemblies that are not located under the 3D object 2000, in order to avoid protruding over the top surface 1210 of the second plate 1200 when not needed.

Figure 6A:
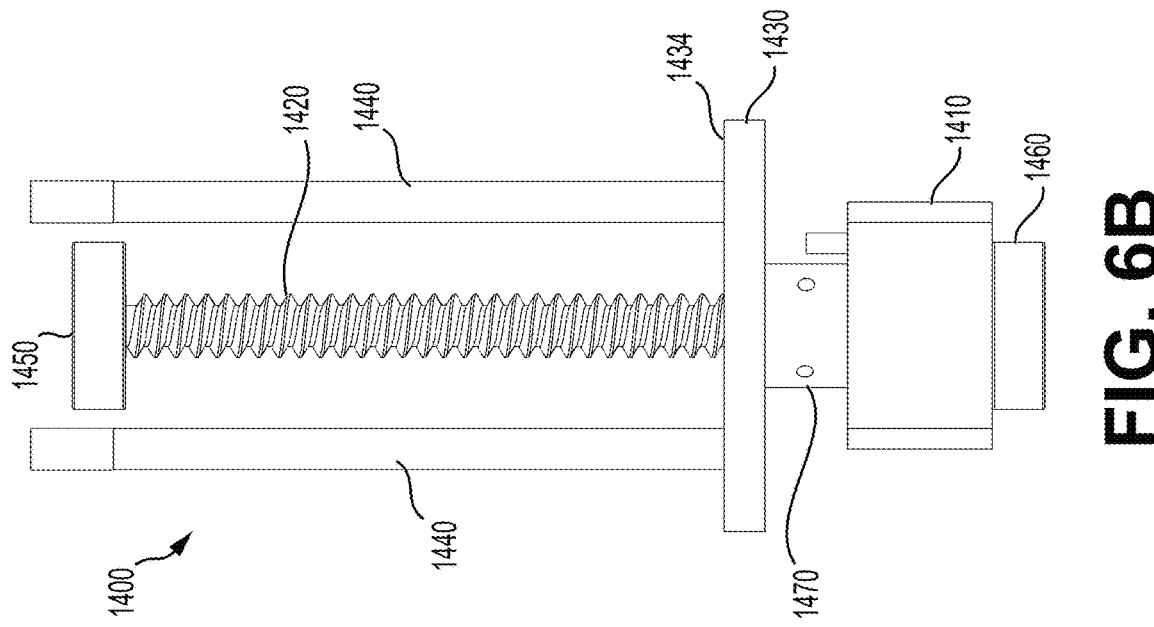
FIG. 6A is a perspective view illustrating a post assembly of the build platform of FIG. 1.
Figure 6B:
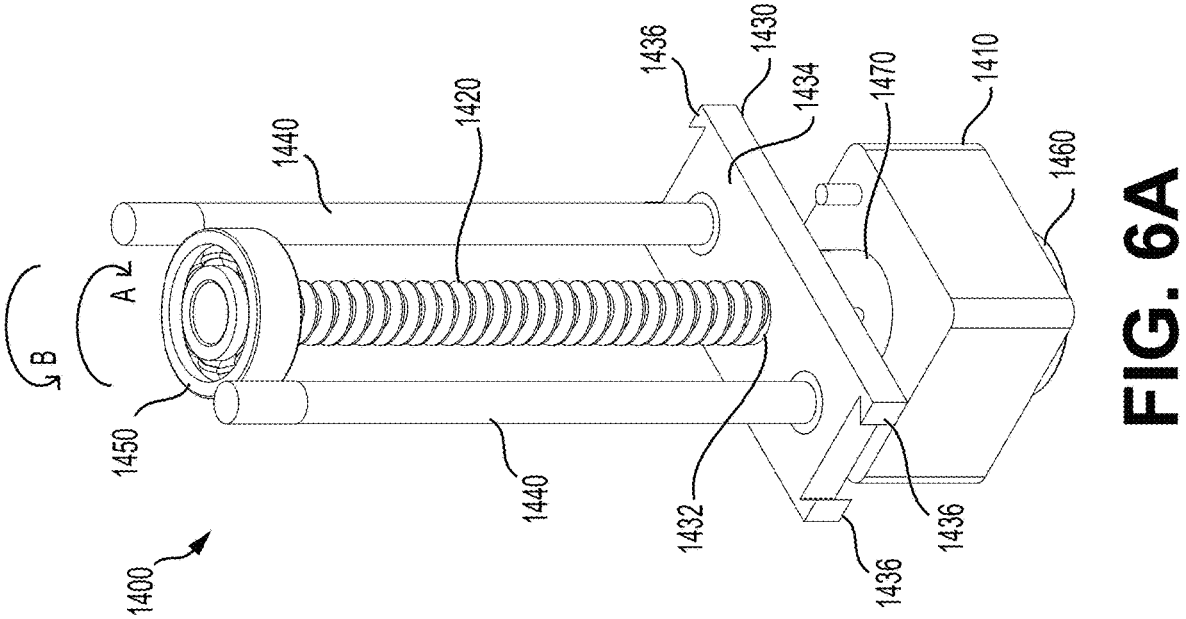
FIG. 6B is a side view illustrating the post assembly of the build platform of FIG. 6A.

Referring to FIGS. 6A-6B, each post assembly 1400 may include an electric motor 1410, an elongated and threaded member 1420 (hereinafter referred to as a threaded rod 1420) extending in the Z direction, the threaded rod 1420 being connected to the motor 1410 and configured to be rotated by the motor 1410 bi-directionally, a plate 1430 threadably engaged with the threaded rod 1420 via a through opening 1432 thereof, and a plurality of posts 1440 (e.g., two posts, as illustrated in FIGS. 6A-6B) connected to the plate 1430 and extending in the Z direction from an upper surface 1434 of the plate 1430. The plate 1430 may also be movably coupled (e.g., slidably coupled) to one or more adjoining elongated structure 1300, for example, via hook-like structures 1436 (see FIG. 6A), in order to prevent rotation of the plate 1430 by threaded rod. Therefore, the hook-like structures 1436 enable the plate 1430 to slide along the length of the one or more adjoining structure 1300 it is connected to while the threaded rod 1420 is being spun by the motor 1410.

Each electric motor 1410, each elongated and threaded member 1420, and each plate 1430 of each post assembly 1400 may face a bottom surface 1220 (see FIG. 3) of the second plate 1200. In other words, each electric motor 1410, each elongated and threaded member 1420, and each plate 1430 of each post assembly 1400 may be, for example, visible from the bottom surface 1220 of the second plate 1200.

In addition, each electric motor 1410, each elongated and threaded member 1420, and each plate 1430 of each post assembly 1400 may face a top surface 1110 (see FIG. 3) of the first plate 1100. In other words, each electric motor 1410, each elongated and threaded member 1420, and each plate 1430 of each post assembly 1400 may be, for example, visible from the top surface 1110 of the first plate 1100.

Referring to FIGS. 5-6, each post assembly 1400 may also include a first bearing 1450 rotatably connecting an upper end of the threaded rod 1420 to the second plate 1200, a second bearing 1460 rotatably connecting a lower end of the threaded rod 1420 to the first plate 1100, and a ring (or collar) 1470 limiting the plate 1430 from further traveling downwardly (e.g., from further traveling toward the first plate 1100). The ring 1470 may be attached to, for example, the motor 1410 or to another component of the platform assembly 1000.

The bearings 1450, 1460 are illustrated in FIG. 6A as being ball bearings, but the present disclosure is not limited to this configuration. For example, other kinds of bearings (e.g., friction bearings) may be used to rotatably couple the threaded rod 1420 of each post assembly 1400 to the first and/or second plates 1100, 1200. Alternatively, one or more of the first and second bearings 1450, 1460 may be omitted.

The motor 1410 of each post assembly 1400 may be electrically connected to the controlling circuit 1500 in order to be selectively operated (e.g., to rotate) when needed by the controlling circuit 1500. A housing (or stationary exterior component) of the motor 1410 of each post assembly 1400 may be fixedly connected to the first plate 1100.

The motor 1410 of each post assembly 1400 may be selectively powered to rotate the threaded rod 1420 in a first direction A (see FIG. 6A). The rotation of the threaded rod 1420 in the first direction A may cause the plate 1430 to be moved vertically, in the Z direction, upwardly (e.g., toward the second plate 1200) due to the threaded engagement between the plate 1430 and the threaded rod 1420. This configuration, in turn, can cause the posts 1440 of each post assembly 1400 to be raised upwardly over the top surface 1210 of the second plate 1200.

In each post assembly 1400, the amount of upwardly movement of the posts 1440 depends on the amount of rotation of the threaded rod 1420 in the first direction A (e.g., the number of turns or turning angle of the threaded rod 1420), which, in turn, is controlled by the motor 1410. In each post assembly 1400, the controlling circuit 1500 can be configured to selectively power the motor 1410 to cause the motor 1410 to rotate the threaded rod 1420 in the first direction A by a certain amount (e.g., by a certain angle or number of revolutions) in order to raise the post(s) 1440 to a desired height over the top surface 1210 of the second plate 1200.

In each post assembly 1400, the motor 1410 may also be selectively powered to rotate the threaded rod 1420 in a second direction B (see FIG. 6A), opposite to the first direction A. In each post assembly 1400, the rotation of the threaded rod 1420 in the second direction B may cause the plate 1430 to be moved vertically (e.g., in a-Z direction) downwardly (e.g., toward the first plate 1100) due to the threaded engagement between the plate 1430 and the threaded rod 1420. This configuration, in turn, can cause the posts 1440 of each post assembly 1400 to be lowered.

In each post assembly 1400, the controlling circuit 1500 can be configured to selectively power the motor 1410 to rotate the threaded rod 1420 in the second direction B by a certain amount (e.g., by a certain angle or number of revolutions) in order to lower the posts 1440 to a desired height, for example, to reduce the height of the posts 1440 over the top surface 1210 of the second plate 1200 and/or to bring the posts 1440 entirely under the top surface 1210 of the second plate 1200.

Since each post assembly 1400 can be independently powered by the controlling circuit 1500, the post(s) 1440 of each post assembly 1400 of a platform assembly 1000 of a 3D printer of the present disclosure can be raised and lowered as needed, independently of the operation of the other post assemblies, based on the configuration of a 3D structure to be created by the 3D printer. This configuration can be used to provide structural support for the flowable filament material at a range of elevations above the top surface 1210 of the second plate 1200 during a printing job.

In addition, this configuration eliminates the need for manually forming a supporting structure and manually placing the supporting structure on the platform, as must be done when using a conventional 3D printer, prior to starting a printing job that requires connecting two or more separated structural components of a 3D object at an elevation above the building surface of the platform.

While the post assembly 1400 described with reference to FIGS. 6A-6B includes a pair of round bar-shaped posts 1440, the present disclosure is not limited by the configuration.

Figure 7:
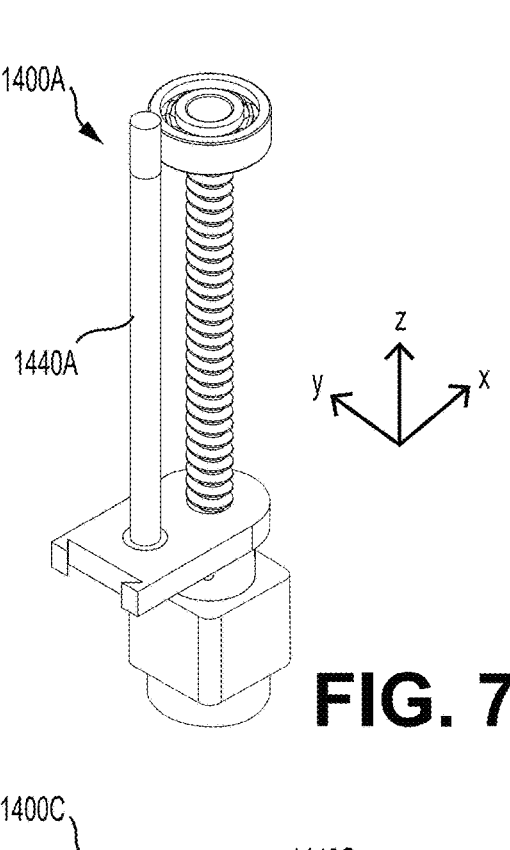
FIG. 7 is a perspective view illustrating a post assembly according to an embodiment of the present disclosure.
Figure 8:
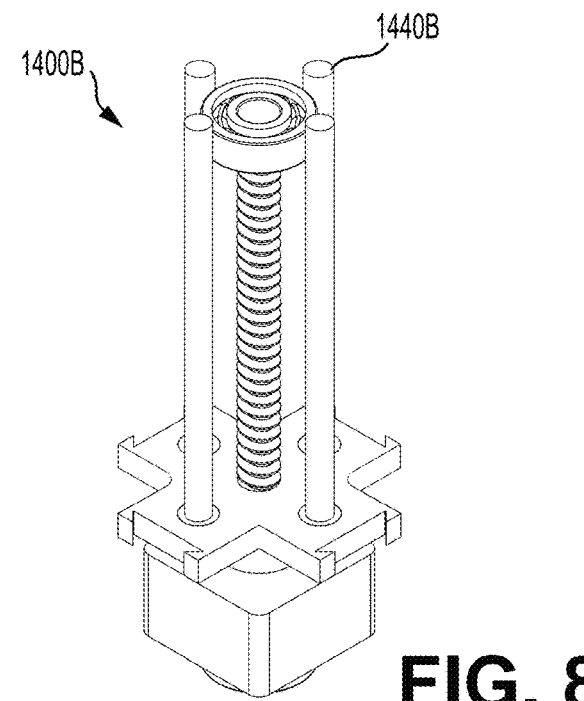
FIG. 8 is a perspective view illustrating a post assembly according to an embodiment of the present disclosure.
Figure 9:
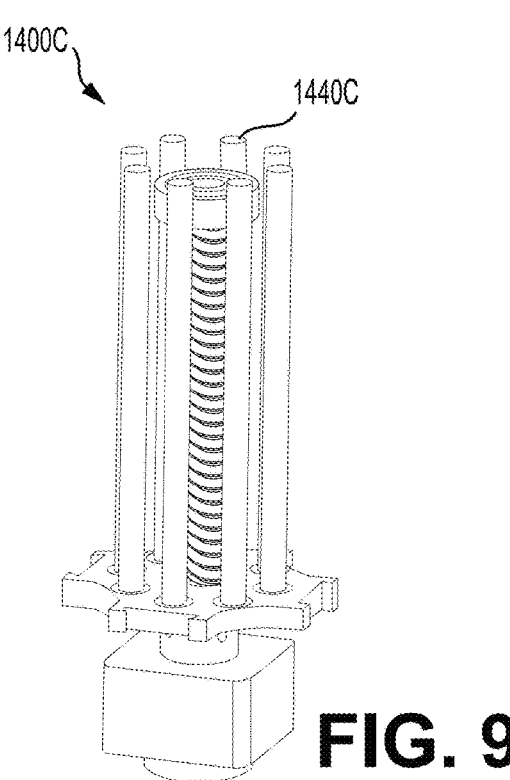
FIG. 9 is a perspective view illustrating a post assembly according to an embodiment of the present disclosure.
Figure 10:
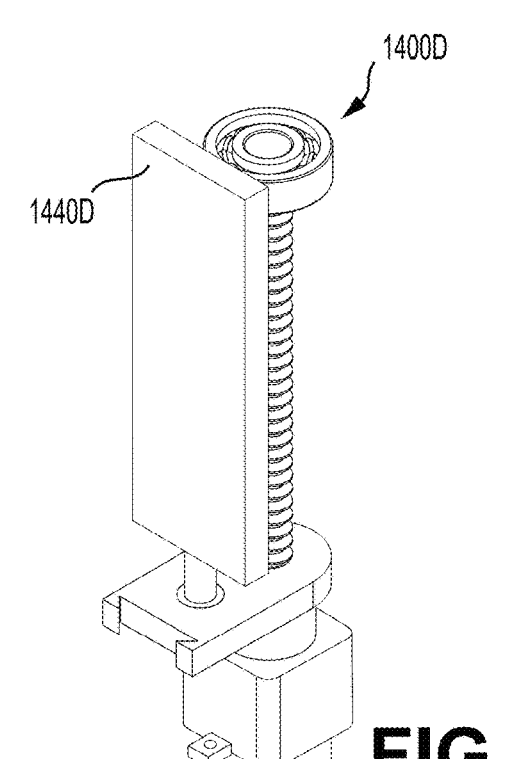
FIG. 10 is a perspective view illustrating a post assembly according to an embodiment of the present disclosure.

For example, the number of posts, the shape of the posts, the size of the posts and/or the arrangement of the posts on the plate of each post assembly can be varied as needed. For example, FIG. 7 illustrates a non-limiting configuration of a post assembly 1400A that includes one round bar-shaped post 1440A. FIG. 8 illustrates a non-limiting configuration of a post assembly 1400B that includes four round bar-shaped posts 1440B. FIG. 9 illustrates a non-limiting example of a post assembly 1400C that includes eight round bar-shaped posts 1440C. FIG. 10 illustrates a non-limiting example of a post assembly 1400D that includes a flat bar-shaped post 1440D. Other configurations of posts assemblies may also include a different number of posts, a combination of posts of different shapes and/or sizes in the same post assembly, posts arranged in a geometrical arrangement and/or equally spaced from one another, as illustrated in FIGS. 6A-9, posts arranged in a random order and/or not equally spaced from one another, a combination thereof, etc.

The post assemblies of a platform assembly of a 3D printer of the present disclosure may be spaced apart from one another such that a separation distance in the horizontal plane (e.g., a gap in the X and/or Y directions) between a pair of adjacent posts (whether posts of the same post assembly and/or post(s) of neighboring post assemblies) is of a distance that is sufficient to structurally support a flowable filament as it is being poured over the neighboring posts in order to prevent the flowable filament material from collapsing due to its own weight above the top surface 1210 of the second plate 1200. This is so because when the filament material is being discharged from the nozzle during a printing job, and although in a flowable form, the filament material still has some structural strength that enables it to temporarily lay unsupported over a certain horizontal distance (e.g., while cooling and hardening) without collapsing. The horizontal distance between neighboring posts in the platform assembly of the present disclosure may be set to be about equal to or less than the horizontal distance that can cause the flowable filament to collapse. This configuration, in combination with the variously adjustable configuration of the post assemblies of the present disclosure, can eliminate the need for manually creating and placing supporting blocks over the platform assembly of a 3D printer of the present disclosure.

Non-limiting dimensions of the first and second plates 1100, 1200 (e.g., in the X-Y plane) can be, for example, about 200 mm by 200 mm each, about 250 mm by 250 mm each, about 300 mm to about 300 mm each, etc. A non-limiting separation distance between the first and second plates 1100 and 1200 can range, for example, from about 100 mm to about 200 mm. A non-limiting distance between adjacent post assemblies 1400 can range, for example, from about 10 mm to about 30 mm. These dimensions can be varied as needed depending on a size of a 3D object to be printed and/or depending on the properties of the filament material used for executing the 3D print job.

The top surface 1210 of the second plate 1200 and/or a top surface of each post 1440 of each post assembly 1400 may be coated with a material configured to provide good adhesion with the flowable filament material during a printing process for stability purposes (e.g., so that the 3D piece being printed does not move during the printing process), yet requiring only a reasonable amount of force to detach the finished 3D piece therefrom when completed.

Figure 11:
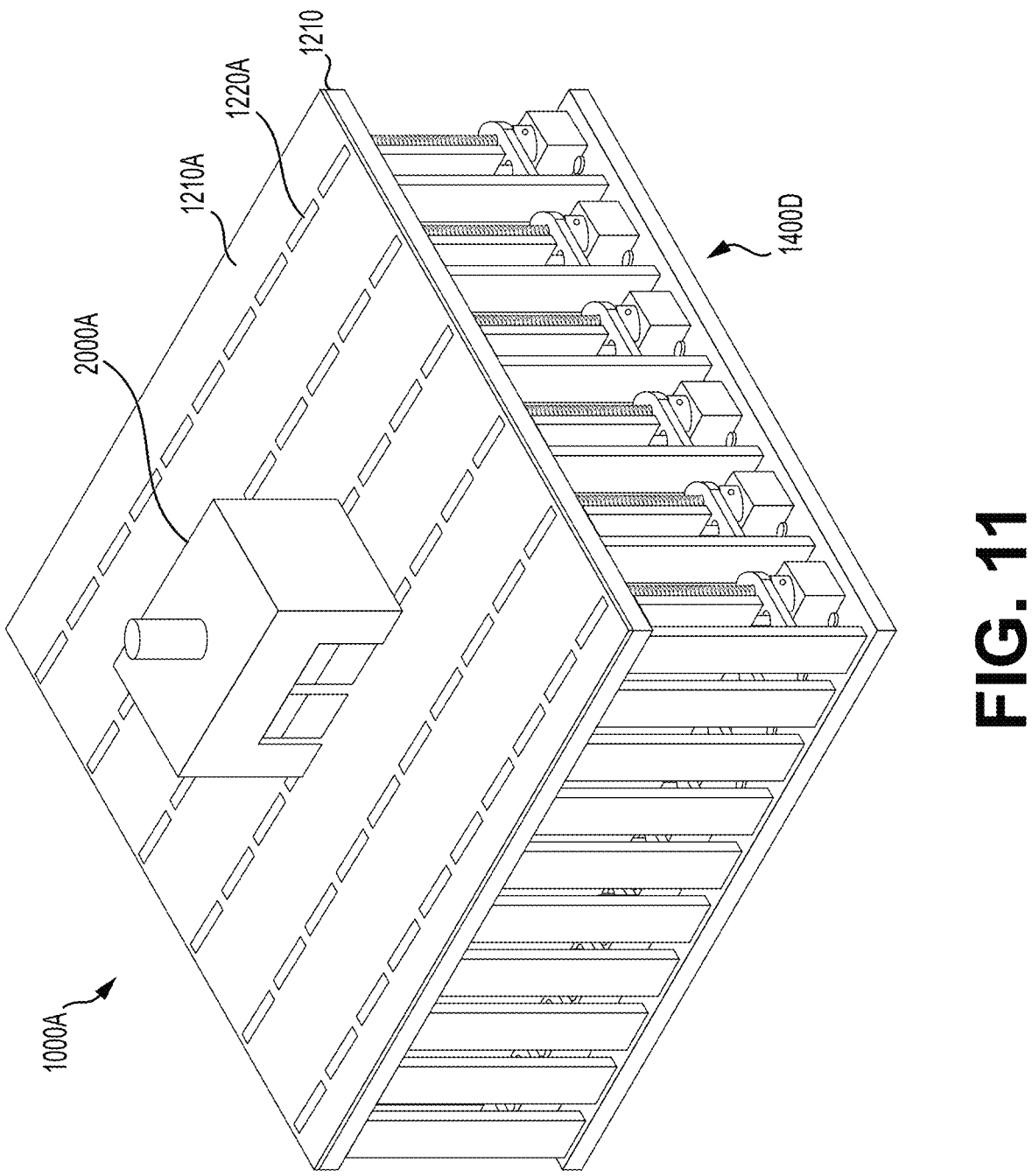
FIG. 11 is a perspective view illustrating a build platform of a 3D printer according to an embodiment of the present disclosure.
Figure 12:
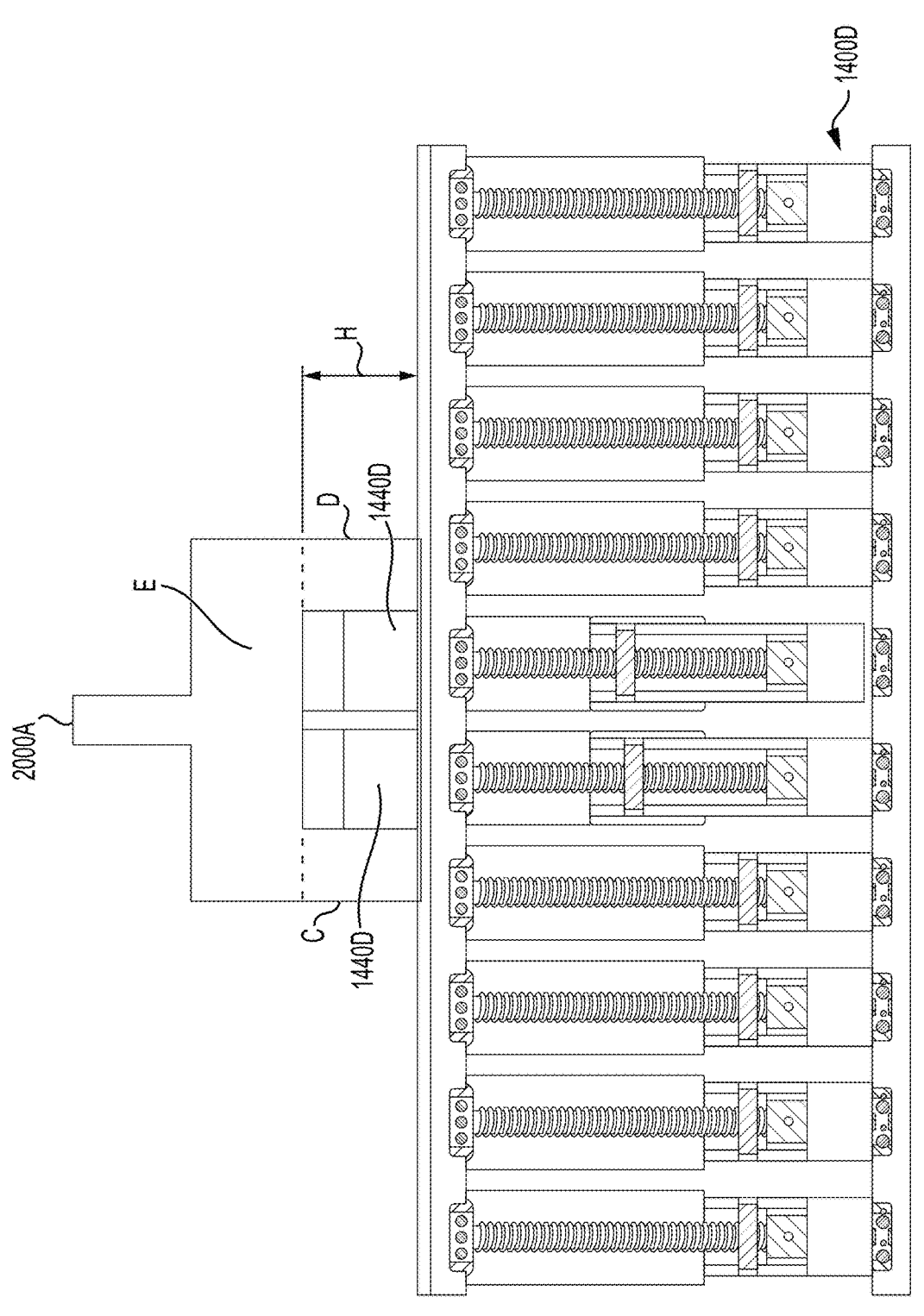
FIG. 12 is a side view illustrating the build platform of FIG. 11.

FIGS. 11 and 12 illustrate a platform assembly 1000A of a 3D printer according to an embodiment of the present disclosure. In the embodiment of FIGS. 11-12, the platform assembly 1000A may include a plurality of post assemblies 1400D as illustrated in FIG. 10. As exemplarily illustrated in FIGS. 11-12, a plurality of posts 1440D of a plurality of post assemblies 1400D can be selectively raised to aid the formation of a component E between components C and D of a 3D object 2000A at a height H without using a separate supporting under component E.

As illustrated in FIG. 11, top plate 1200A of the platform assembly 1000A may include rectangular shaped through openings 1220A in order to accommodate the posts 1440D therethrough.

Components and/or features of the 3D printer platform assembly of FIGS. 11-12 that are not described in detail may be assumed to be similar to or the same as corresponding components/features of a 3D printer platform assembly as described elsewhere in this specification.

While the elongated structures 1300 and post assemblies 1400 in are illustrated as being regularly arranged in the drawings (e.g., in rows and columns and evenly spaced from one another), the present disclosure is not limited to this configuration. For example, the elongated structures 1300 and/or post assemblies of the present disclosure (including the post assemblies 1400-1400D, etc.) may be arranged in a staggered formation, in a different geometrical arrangement, in an irregular arrangement, or in a combination of these arrangements between the first and second plates 1100, 1200.

The size of each one of the first and second plates of a platform assembly of the present disclosure may be predetermined. In addition, the number of post assemblies included in a platform assembly may be predetermined.

Moreover, the location (e.g., coordinates in the X-Y plane) of each post assembly across the surface areas of the first and second plates may be predetermined, the location (e.g., coordinates in the X-Y plane) of each post included in each post assembly across the surface areas of the first and second plates may be predetermined, the maximum height by which each post of each post assembly can extend over the top surface of the second plate can be predetermined, and the current elevation of a top surface of each post of each post assembly may be determinable or known at all times during the operation of a 3D printer of the present disclosure by using the controlling circuit.

Figure 13:
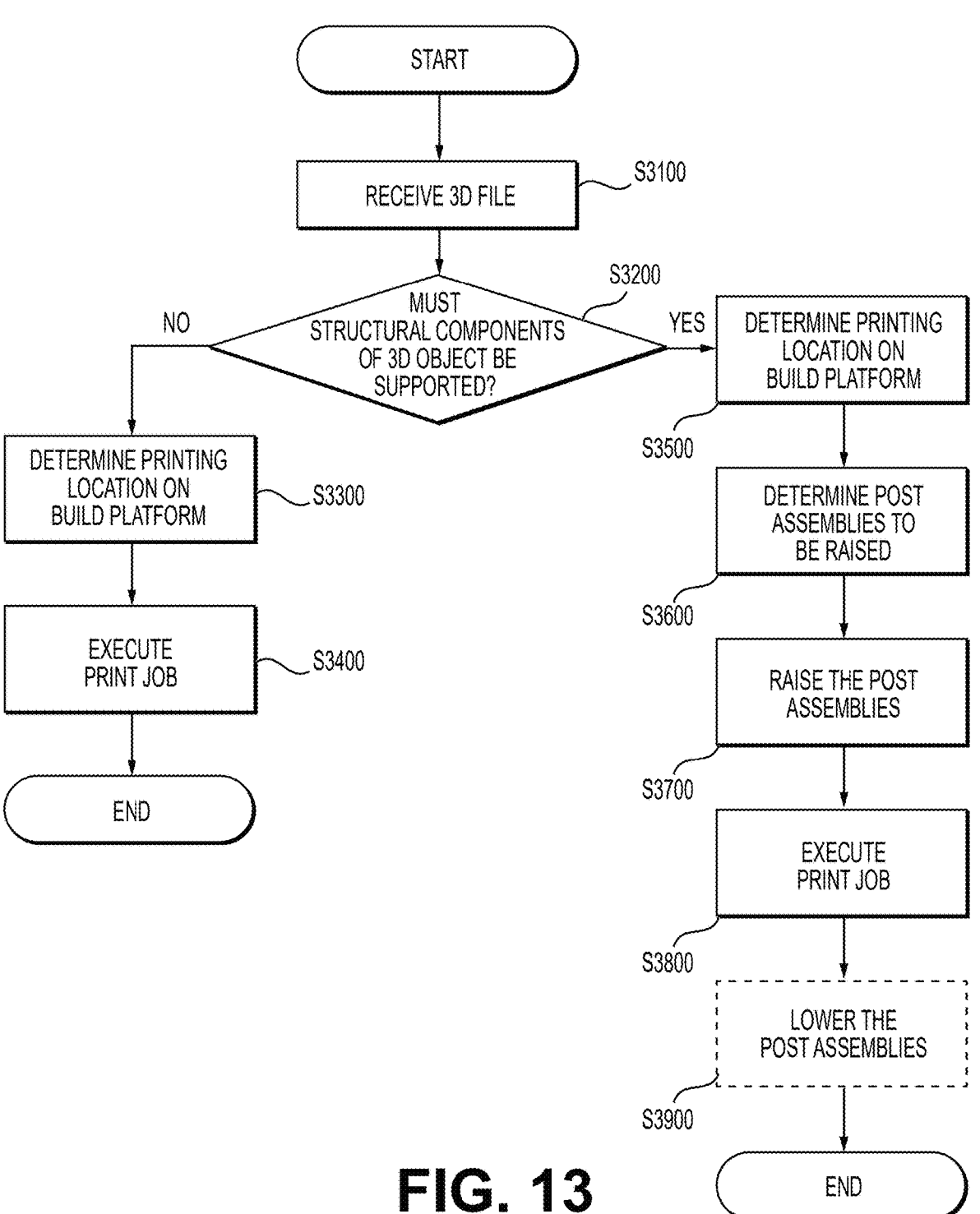
FIG. 13 is a flowchart illustrating a method of operating a 3D printer that includes a build platform of the present disclosure.

Referring to FIG. 13, a method of operating a 3D printer of the present disclosure includes receiving a 3D design file for printing (Step S3100), the 3D design file including information concerning the structural configuration of a 3D object. Step S3200 may include determining whether the 3D object to be printed includes a structural component, the printing of which will require structural support to be provided above the top surface of the second plate. When the answer is no, Step S3300 may be carried out to determine a region of the top surface of the second plate where the 3D object will be printed, and Step S3400 may be carried out to execute the print job in order to create the 3D object.

When the answer in step S3200 is yes, the method may include determining a region of the second plate where the 3D object will be built (the location can be specified by a user or determined automatically in a way that enables the 3D object to fit on the second plate) (Step S3500), determining which post assemblies to raise and by how much over the top surface of the second plate based on the region of the second plate on which the 3D object will be built and the structural shape and size of the 3D object (Step S3600), raising the post assemblies (Step S3700), and printing the 3D object (Step S3800). Step S3900 may include lowering the raised post assemblies upon finishing the printing job. Step S3900 may be optional.

The raising of the post assemblies (Step S3700) can be carried out during the printing process (Step S3800), for example, when needed and/or based on the location of the printing nozzle. Alternatively, the raising of the post assemblies (Step S3700) can be carried out before starting the printing process (Step S3800).

The present disclosure provides a 3D printer and method of operation that can be used to significantly facilitate the printing of 3D objects with complex shapes, especially the printing of 3D objects that have gaps or voids extending along their walls/structural components.

While the present disclosure has been particularly shown and described with reference to exemplary embodiments thereof, it will be apparent to those of ordinary skill in the art that various changes in form and detail may be made therein without departing from the spirit and scope of the present disclosure as defined by the following claims.

What is claimed is:

1. A platform assembly for a three-dimensional (3D) printer, comprising:
   a first platform assembly plate;
   a second platform assembly plate separated from the first platform assembly plate, wherein the second platform assembly plate defines a build surface of the 3D printer;
   a plurality of elongated structures extending between the first and second platform assembly plates and connecting the first and second platform assembly plates to one another; and
   a plurality of post assemblies disposed between the first and second platform assembly plates,
   wherein each one of the post assemblies includes at least one elongated post,
   wherein the second platform assembly plate includes a plurality of through openings, each through opening of the plurality of through openings being configured to accommodate therethrough a respective one of the at least one elongated post of each post assembly of the plurality of post assemblies; and
   wherein each one of the post assemblies can be selectively operated to cause its respective at least one elongated post to extend through its respective through opening in the second platform assembly plate by a certain length,
   wherein a first post assembly of the plurality of post assemblies includes:
   said at least one elongated post;
   a threaded rod, wherein an entire length of the threaded rod extends between the first and second platform assembly plates; and
   a post assembly plate fixedly coupled to said at least one elongated post and threadably rotatably coupled to the threaded rod,
   wherein a rotation of the threaded rod is configured to cause the post assembly plate to be moved between the first and second platform assembly plates and to cause the at least one elongated post of the first post assembly to extend through its respective through opening in the second platform assembly plate,
   wherein the least one elongated post of the first post assembly includes a plurality of elongated posts, and
   wherein the threaded rod of the first post assembly is arranged between the plurality of elongated posts.

2. The platform assembly of claim 1, wherein the first post assembly further includes:
   a motor electrically connected to a controlling circuit and structurally connected to the threaded rod, the motor being configured to rotate the threaded rod bi-directionally based on a command of the controlling circuit.

3. The platform assembly of claim 2, wherein the post assembly plate of the first post assembly is slidably connected to a first elongated structure of the plurality of elongated structures such that said post assembly plate can be slid along a length of the first elongated structure,
   wherein the slidable connection between the post assembly plate of the first post assembly and the first elongated structure is configured to prevent said post assembly plate from rotating when the threaded rod of the first post assembly is being rotated, and
   wherein the threaded connection between the post assembly plate of the first post assembly and the threaded rod of the first post assembly plate is configured to cause said post assembly plate to be moved toward the first platform assembly plate or toward the second platform assembly plate, depending on a rotation direction of said threaded rod.

4. The platform assembly of claim 1, wherein the plurality of post assemblies is arranged in rows and columns.

5. The platform assembly of claim 1, wherein the plurality of post assemblies is arranged in a staggered formation.

6. The platform assembly of claim 1, wherein the plurality of elongated structures is arranged in rows and columns.

7. The platform assembly of claim 1, wherein the plurality of elongated structures is arranged in a staggered formation.

8. The platform assembly of claim 1, wherein the at least one elongated post of a first one of the post assemblies has a round bar shape.

9. The platform assembly of claim 1, wherein the at least one elongated post of a first one of the post assemblies has a flat bar shape.

10. The platform assembly of claim 1, wherein the threaded rod is rotatably coupled to the second platform assembly plate.

11. The platform assembly of claim 1, wherein the first post assembly further includes a first bearing rotatably connecting an upper end of the threaded rod to the second post assembly plate.

12. The platform assembly of claim 11, wherein the first post assembly plate further includes a second bearing rotatably connecting a lower end of the threaded rod to the first post assembly plate.

13. The platform assembly of claim 2, wherein the motor is disposed closer to the first platform assembly plate than to the second platform assembly plate, and
   wherein the first post assembly further includes a ring attached to the motor, the ring being configured to prevent the post assembly plate from traveling along a length of the threaded rod beyond a location of the ring when said post assembly plate is moved in a direction toward the first platform assembly plate.

14. The platform assembly of claim 1, wherein the at least one elongated post of the first post assembly is configured to be selectively moved between:

a retracted state, in which an entire length of said at least one elongated post extends between the first platform assembly plate and an outer side surface of the second platform assembly plate that defines the build surface of the 3D printer, such that the at least one elongated 5 post does not protrude from said outer side surface of the second platform assembly plate when arranged in the retracted state; and an extended state, in which the at least one elongated post of the first post assembly extends through its respective 10 opening in the second platform assembly plate, thereby protruding from the outer side surface of the second platform assembly plate by said certain length.

\* \* \* \* \*